United States Patent
Barros et al.

(10) Patent No.: US 8,424,011 B2
(45) Date of Patent: Apr. 16, 2013

(54) MULTIPLE INSTANCE MANAGEMENT FOR WORKFLOW PROCESS MODELS

(75) Inventors: Alistair P. Barros, Camira (AU); Alexander Grosskopf, Berlin (DE)

(73) Assignee: SAP AG, Walldorf (DE)

(*) Notice: Subject to any disclaimer, the term of this patent is extended or adjusted under 35 U.S.C. 154(b) by 1396 days.

(21) Appl. No.: 11/809,207

(22) Filed: May 31, 2007

(65) Prior Publication Data

US 2008/0301684 A1    Dec. 4, 2008

(51) Int. Cl.
*G06F 9/46*    (2006.01)

(52) U.S. Cl.
USPC ............ 718/106; 718/102; 717/104; 717/119

(58) Field of Classification Search ............ 718/106
See application file for complete search history.

(56) References Cited

U.S. PATENT DOCUMENTS

| | | | |
|---|---|---|---|
| 5,960,420 A * | 9/1999 | Leymann et al. ............ 1/1 |
| 6,601,035 B1 * | 7/2003 | Panagos et al. ............ 705/8 |
| 7,694,272 B2 * | 4/2010 | Bronicki et al. ............ 717/109 |
| 2003/0115243 A1 * | 6/2003 | Smith ............ 709/104 |
| 2003/0195789 A1 * | 10/2003 | Yen ............ 705/9 |
| 2005/0071320 A1 * | 3/2005 | Chkodrov et al. ............ 707/3 |
| 2006/0031849 A1 * | 2/2006 | Barta et al. ............ 719/320 |
| 2006/0101467 A1 * | 5/2006 | Buco et al. ............ 718/102 |
| 2006/0136924 A1 * | 6/2006 | Sadiq et al. ............ 718/104 |
| 2006/0161272 A1 * | 7/2006 | Haller et al. ............ 700/29 |
| 2006/0167735 A1 * | 7/2006 | Ward ............ 705/8 |
| 2006/0195330 A1 * | 8/2006 | Bogner et al. ............ 705/1 |
| 2007/0129980 A1 * | 6/2007 | Barros ............ 705/8 |
| 2007/0135936 A1 * | 6/2007 | Dumas et al. ............ 700/29 |
| 2008/0148367 A1 * | 6/2008 | Hilerio et al. ............ 726/5 |
| 2008/0301419 A1 * | 12/2008 | Barros et al. ............ 712/233 |
| 2008/0306746 A1 * | 12/2008 | Racca et al. ............ 705/1 |
| 2009/0133019 A1 * | 5/2009 | Dumas et al. ............ 718/100 |

OTHER PUBLICATIONS

BPMI Org., "Business Process Modeling Notation (BPMN) Specification 1.0", Final Adopted Specification, Technical report, OMG, Feb. 1, 2006, 308 pages.
Baeten et al., "Process Algebra", Cambridge University Press, New York, NY, USA, 1991, 17 pages.
Christensen et al., "Design/CPN Overview of CPN ML Syntax", Version 3.0, University of Aarhus, 1996, 15 pages.
Dijkman et al.,"Formal Semantics and Automated Analysis of BPMN Process Models", QUT ePrints, ID Code—5969, Jan. 2007, 25 pages.
Decker et al., "Formalizing Service Interactions", Proceedings of the 4th International Conference on Business Process Management (BPM 2006), vol. 4102 of LNCS, 2006, 16 pages.
Desel et al., "Place/transition Petri nets", Lectures on Petri Nets I: Basic Models, Lecture Notes in Computer Science, vol. 1491, 1998, pp. 122-173.
White, S., "Using BPMN to Model a BPEL Process", BPTrends, vol. 3, No. 3, Mar. 2005, 18 pages.

(Continued)

*Primary Examiner* — Emerson Puente
*Assistant Examiner* — Hiren Patel
(74) *Attorney, Agent, or Firm* — Brake Hughes Bellermann LLP

(57) ABSTRACT

A first instance and a second instance of an activity of a process model may be executed, the first instance, the second instance, and the activity being associated with activity state data describing one or more states thereof. A co-process associated with the first instance, the second instance, and the activity may be spawned, and the co-process may be executed based on the activity state data.

20 Claims, 8 Drawing Sheets

OTHER PUBLICATIONS

Jensen, K., "Coloured Petri Nets", Basic Concepts, Analysis Methods and Practical Use, vol. 1, Springer, 1996, 100 pages.

Jensen, K., "Coloured Petri Nets", Basic Concepts, Analysis Methods and Practical Use, vol. 2, Analysis Methods, Monographs in Theoretical Computer Science, Springer-Verlag, 1997, 100 pages.

Kiepuszewski et al., "Fundamentals of control flow in workflows", QUT Technical report, FIT-TR-2002-03, 2002, 62 pages.

Meyer, B., "Introduction to the theory of programming languages", Prentice-Hall, Inc., 1990, 5 pages.

Milner et al., "Communicating and Mobile Systems: the [Pi]-Calculus", Cambridge University Press, 1999, 10 pages.

Mendling et al., "Towards Workflow Pattern Support of Event-Driven Process Chains (EPC)", Proceedings of the 2nd Workshop XML4BPM, 2005, 15 pages.

Milner et al., "A Calculus of Mobile Processes, I", Information and Computation, vol. 100, No. 1, 1992, pp. 1-40.

Ouyang et al., "Translating Standard Process Models to BPEL", BPM Center Report, BPM-05-27, BPMcenter Org, 2005, 17 pages.

Ouyang et al., "From BPMN Process Models to BPEL Web Services", Proceedings of the IEEE International Conference on Web Services (ICWS'06), Sep. 2006, pp. 285-292.

Ouyang et al., "Formal Semantics and Analysis of Control Flow in WS-BPEL", BPM Center Report, BPM-05-13, BPMcenter. org, 2005, 34 pages.

Ouyang et al., "From Business Process Models to Process-oriented Software Systems: The BPMN to BPEL Way", QUT eprint, ID-5969, 2006, 37 pages.

Ouyang et al., "Translating BPMN to BPEL", BPM Center Report BPM-06-02, BPMcenter.org, 2006, 22 pages.

Petri, Carl A., "Communication with Automata", Technical Report No. RADC-TR-65-377, vol. 1, Supplement 1, Jan. 1966, 97 pages.

Phifer et al., "Technologies That Enable Business Process Fusion", Gartner, Inc., Research, ID No. AV-20-9898, Oct. 16, 2003, 4 pages.

Puhlmann et al., "Using the Pi-calculus for Formalizing Workflow Patterns", 3rd International Conference on Business Process Management, vol. 3649, 2005, pp. 153-168.

Wohed et al., "Pattern Based Analysis of BPEL4WS", Department of Computer and Systems Sciences, Stockholm University/The Royal Institute of Technology, Sweden, 2003, 20 pages.

Recker et al., "Do Process Modelling Techniques Get Better? A Comparative Ontological Analysis of BPMN", 16th Australasian Conference on Information Systems, Nov. 29-Dec. 2, 2005, 10 pages.

Recker et al., "On the Translation between BPMN and BPEL: Conceptual Mismatch between Process Modeling Languages", Technical Report, QUT ePrints, ID Code—4637, Jul. 2006, 12 pages.

Russell et al., "Workflow Data Patterns", Proceedings of 24th International Conference on Conceptual Modeling (ER05), vol. 3716, 2005, pp. 1-75.

Russell, et al., "Workflow Control-Flow Patterns: A Revised View", Workflow Patterns Initiative, BPM Center Report BPM-06-22, 2007, 134 pages.

Russell et al., "Workflow Resource Patterns: Identification, Representation and Tool Support", Proceedings of the 17th Conference on Advanced Information Systems Engineering (CAiSE'05), vol. 3520 of LNCS, 2005, 16 pages.

Wohed et al., "On the Suitability of BPMN for Business Process Modelling", Proceedings 4th International Conference on Business Process Management (BPM 2006), LNCS, 2006, 17 pages.

Wohed et al., "Pattern-based Analysis of UML Activity Diagrams", Beta, Research School for Operations Management and Logistics, 2004, 22 pages.

Hofstede, et al., "How to formalize it? Formalization Principles for Information System Development Methods", Information and Software Technology, vol. 40, No. 10, 1998, pp. 1-33.

Van der Aalst, et al., "Patterns and XPDL: A Critical Evaluation of the XML Process Definition Language", Technical report, Technical Report FIT-TR-2003-06, Queensland University of Technology, Brisbane, 2003, 30 pages.

Van der Aalst, et al., "Advanced Workflow Patterns", Proceedings of the 7th International Conference on Cooperative Information Systems, 2000, pp. 18-29.

Van der Aalst, et al., "Pattern-Based Analysis of BPML (and WSCI)", Queensland University of Technology, Brisbane: QUT Technical Report FIT-TR-2002-05, 2002, 27 pages.

Van der Aalst, et al., "Workflow Patterns", Distributed and Parallel Databases, vol. 14, No. 1, 2003, 70 pages.

Dongen et al., "The ProM Framework: A New Era in Process Mining Tool Support", Application and Theory of Petri Nets, vol. 3536, 2005, 10 pages.

Wynn et al., "Achieving a General, Formal and Decidable Approach to the OR-join in Workflow using Reset nets", Applications and Theory of Petri Nets, vol. 3536, 2005, pp. 423-443.

White, S., "Process Modeling Notations and Workflow Patterns", BPTrends, Workflow Handbook, Mar. 2004, pp. 1-24.

Wynn et al., "Synchronisation and Cancellation in Workflows based on Reset nets", BPM Center Report BPM-06-26, BPMcenter, Jun. 2006, pp. 1-38.

Wohed et al., "Pattern-based Analysis of BPMN-An Extensive Evaluation of the Control-Flow, the Data and the Resource Perspectives", BPM Center Report BPM-05-26, BPMcenter.org, 2005, 23 pages.

Extended European Search Report for EP Application No. 08004787. 1, mailed Jun. 27, 2008, 7 pages.

Response to Extended European Search Report for EP Application No. 08004787.1, filed Jun. 3, 2009, 18 pages.

Alves, et al "Web Services Business Process Execution Language Version 2.0", Public Review Draft, Aug. 23, 2006, 276 pages.

Alves, et al "Web Services Business Process Execution Language Version 2.0", OASIS Standard, Apr. 11, 2007, 264 pages.

* cited by examiner

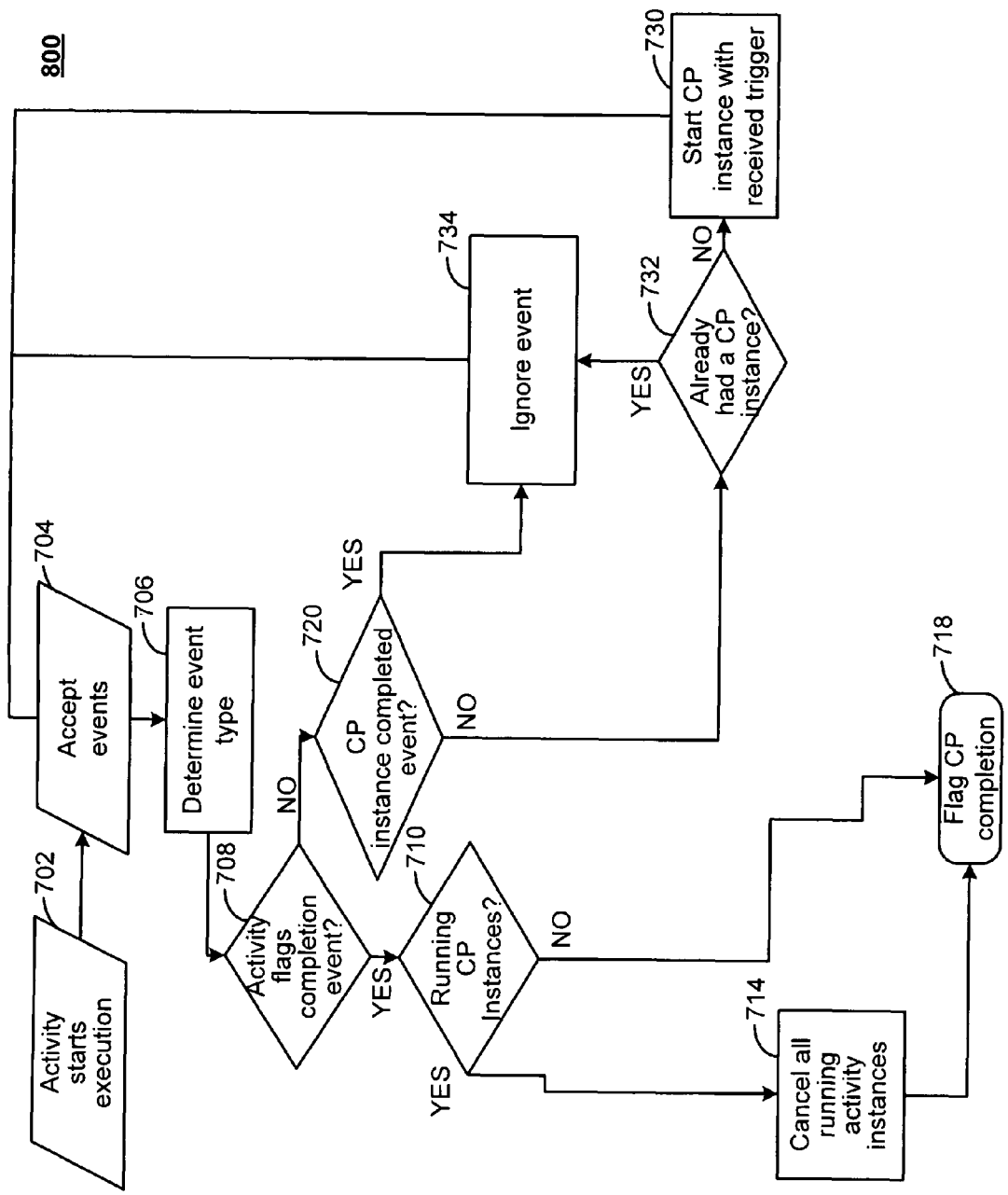

MULTIPLE INSTANCE MANAGEMENT FOR WORKFLOW PROCESS MODELS

TECHNICAL FIELD

This description relates to workflow process models.

BACKGROUND

Modeling languages may be used as meta-languages to describe and execute underlying processes, such as business processes. For example, process modeling languages allow an enterprise to describe tasks of a process, and to automate performance of those tasks in a desired order to achieve a desired result. For instance, the enterprise may implement a number of business software applications, and process modeling may allow coordination of functionalities of these applications, including communications (e.g., messages) between the applications, to achieve a desired result. Further, such process modeling generally relies on language that is common to, and/or interoperable with, many types of software applications and/or development platforms. As a result, process modeling may be used to provide integration of business applications both within and across enterprise organizations.

Thus, such modeling languages allow a flow of activities or tasks to be graphically captured and executed, thereby enabling resources responsible for the activities to be coordinated efficiently and effectively. The flow of work in a process is captured through routing (e.g., control flow) constructs, which allow the tasks in the process to be arranged into the required execution order through sequencing, choices (e.g., decision points allowing alternative branches), parallelism (e.g., tasks running in different branches which execute concurrently), iteration (e.g., looping in branches) and synchronization (e.g., the coming together of different branches).

In the context of such processes, some tasks or activities of the process(es) may require, or may benefit from, execution of multiple instances thereof. Such multiple instances may enable processes to handle more than one instance of an activity at a time, using a single, generic activity description and a single (or single set) of interface(s). For example, during a loan approval process, there may be an activity related to sending a request to a lender for a loan approval. The activity description may relate, for example, to formulation of relevant information associated with the borrower, or to a generation and tracking of request messages sent to the (potential) lender(s), or to receipt and preliminary analysis of any response messages. Thus, rather than formulating different activities for each loan request, the activity may be instantiated multiple times, i.e., once for each request/lender. Then the loan requests may proceed, for example, in parallel, as the various lenders proceed independently to determine whether and how to proceed.

It is possible to execute such multiple instances simply by instantiating the activity in question multiple times, and then allowing the multiple instances to proceed to a point of completion or cancellation, or until some desired goal (e.g., a desired number of responses from lenders) is reached, at which point some aggregation of results may occur. In practice, however, this approach of simply propagating multiple instances of an activity for later aggregation of results thereof may not be suitable or sufficient to achieve a desired result. For example, in practice, each instance may relate to a long-running process, which may itself be subject to unpredictability. Additionally, during execution of the multiple instances, a customer or administrator may wish to have some knowledge about (or exert some control over) one or more of the instances.

Without suitable management of such multiple instances, process resources may be wasted or used inefficiently, and it may be difficult to make intelligent decisions about how to proceed with regard to the overall activity in question. For example, one or more of the instances may turn out to be unsuitable, and it may be sub-optimal to wait until the aggregation of the multiple instances to determine such a lack of suitability. As another example, new information may become available during (or due to) execution of one of the multiple instances, which, if known, may affect execution of some or all of the remaining instances. Generally, then, it may be problematic, but useful, to manage multiple instances of an activity in a controlled, informed manner.

SUMMARY

According to one general aspect, a system may include an activity handler configured to execute multiple instances of an activity of a process model, and configured to maintain activity state data associated with a state of execution of each of the multiple instances, a co-process handler configured to execute a co-process process model, based on the activity state data, and a mediator configured to provide the co-process handler with the activity state data, for execution of the co-process process model based thereon.

According to another general aspect, a first instance and a second instance of an activity of a process model may be executed, the first instance, the second instance, and the activity being associated with activity state data describing one or more states thereof. A co-process associated with the first instance, the second instance, and the activity may be spawned, and the co-process may be executed based on the activity state data.

According to another general aspect, a computer program product for executing process models may be tangibly embodied on a computer-readable medium and may include executable code that, when executed, is configured to cause at least one data processing apparatus to determine, for each instance of a multiple instance activity, corresponding activity state data and corresponding workflow data. The executable code, when executed, also may be configured to determine an instance identifier associated with each instance, correlate the corresponding activity state data and the corresponding workflow data with respective instances of the multiple instance activity, using one or more of the instance identifiers, and execute a co-process in association with the multiple instance activity, based on the corresponding activity state data, the corresponding workflow data, and the instance identifiers.

The details of one or more implementations are set forth in the accompanying drawings and the description below. Other features will be apparent from the description and drawings, and from the claims.

BRIEF DESCRIPTION OF THE DRAWINGS

FIG. 8 is a flowchart illustrating additional example operations of the system of FIG. 1.

DETAILED DESCRIPTION

Figure 1:
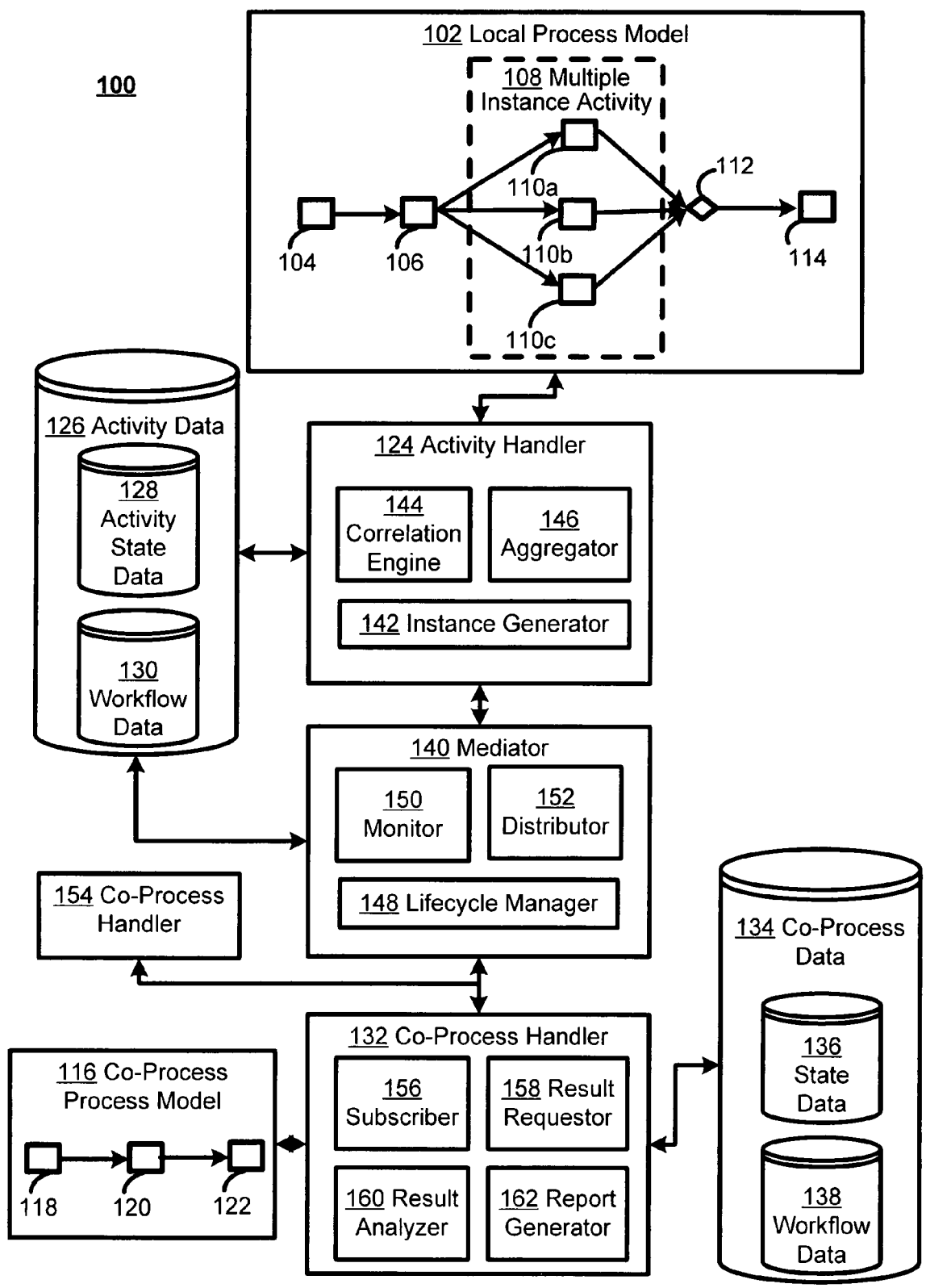
FIG. 1 is a block diagram of a system for managing multiple instances of an activity of a process model.

FIG. 1 is a block diagram of a system 100 for managing multiple instances of an activity of a process model. For example, a process model 102 may include activities 104, 106, and 108, where the activity 108 may be a multiple instances activity that includes example instances 110a, 110b, 110c, which are aggregated at a join or synchronization point 112 to allow the process to proceed to activity 114. In practice, the system 100 provides for the management of the multiple instances 110a, 110b, 110c, including, for example, monitoring, reporting on, or controlling the instances 110a, 110b, 110c. In this way, the instances 110a, 110b, 110c, and the process model 102 as a whole, may proceed in an efficient, informed, and optimized manner.

Figure 2:
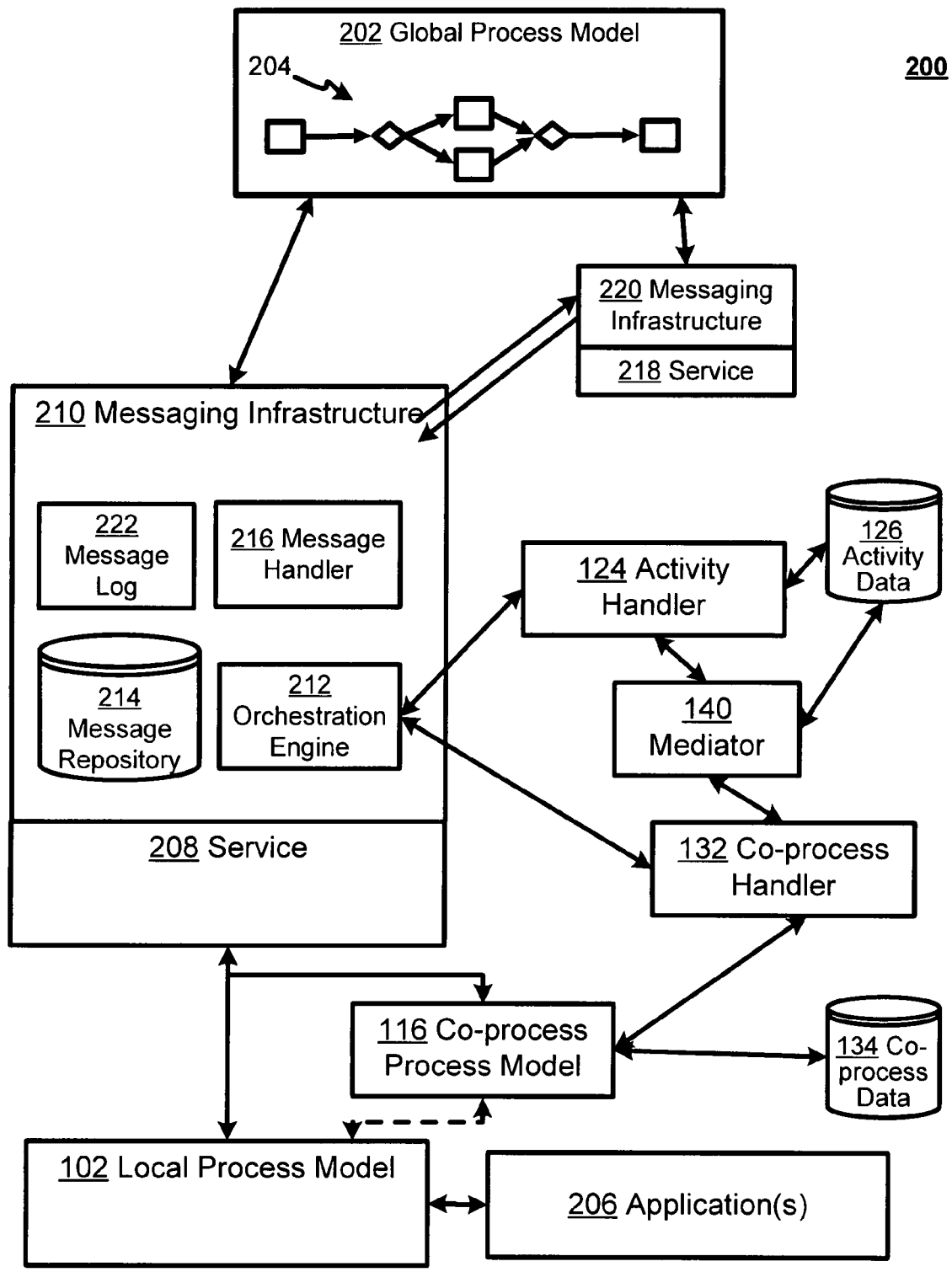
FIG. 2 is a block diagram of a system in which the system of FIG. 1 may be used.

In the example of FIG. 1, the process model 102 is referred to as a local process model, to illustrate, as shown in FIG. 2, below, that the local process model 102 may be in communication with other, external process models (e.g., may exchange messages with other executing processes of another enterprise or organization). Further, the activities and control flow construct(s) 104-114 are included merely as being representative of a process model, where it will be appreciated that virtually any process model or activity may be implemented in the system 100, using virtually any desired (type of) process model definition or formalism.

In FIG. 1, management of the multiple instances 110a, 110b, 110c is achieved using, for example, an attached or associated co-process process model 116, which may include its own representative activities 118, 120, 122. Again, the co-process process model 116 may include virtually any type of process model, process definition, or activity, as would be apparent, and as described in detail, below.

In example implementations, the co-process process model 116 may be referred to as a singleton process, which, as referenced above, allows an administrator, operator, or other user of the system 100 to monitor the instances 110a, 110b, 110c during run-time thereof, collect and distribute data associated with the instances 110a, 110b, and 110c, and influence or direct a behavior(s) of the instances 110a, 110b, 110c. As described in more detail below, the co-process process model 116, such as a singleton process as referenced herein, may thus represent a complex activity that maintains a single instance of itself for a specified time, and that is executed in parallel with, and in the context of, the multiple instance activity 108. For example, by binding the lifecycles of the co-process process model 116 and the multiple instance activity 108 (e.g., by starting and stopping the co-process process model 116 in conjunction with the multiple instance activity 108), and by sharing context there between, information may be shared (and manipulated) regarding the execution of the multiple instances 110a, 110b, 110c, without requiring message exchanges to do so.

For example, the local process model 102 may be executed using an activity handler 124. The activity handler 124 may be implemented, for example, by an otherwise-conventional orchestration engine (as illustrated in the example of FIG. 2), and having the additional or alternative functionality described herein related to management of the multiple instance activity 108. Thus, certain conventional features of the activity handler 124 may be omitted for the sake of clarity and conciseness. In general, though, the activity handler 124 may act to ensure that some or all of the local process model 102 executes in a desired order and in a desired manner (e.g., ensures that the activity 106 has completed before the multiple instance activity 108 begins, or implements a synchronization behavior of the synchronization/merge/join construct 112).

The activity handler 124 may perform other functions, such as maintaining or providing data related to the execution of the local process model 102. For example, the activity handler 124 may maintain activity data 126 related to the multiple instance activity 108. As shown in the example of FIG. 1, the activity data 126 may include activity state data 128, which may include, for example, a current state of execution of each of the multiple instances 110a, 110b, 110c. More particularly, for example, the activity state data 128 may contain information regarding which of the multiple instances 110a, 110b, 110c has begun, or which has completed. Also, although the example of FIG. 1 illustrates only a single activity within each of the multiple instances 110a, 110b, 110c, it will be appreciated that each instance of the activity handler 108 may include a plurality of activities, as well as associated control flow constructs and other parameters useful for executing the multiple instance activity 108. Consequently, the activity state data 128 may include state information regarding, for example, a current state of execution of such activities or control flow constructs.

The activity data also may include workflow data 130, which refers generally to data that may be useful for, or produced by, execution of the multiple instances 110a, 110b, 110c. For example, the local process model 102 may be related to technical control data (e.g., for controlling mechanical or electromechanical sensors and actuators), in which case the workflow data 130 may include data related to different measured parameters, such as pressure or temperature, as well as current control settings for the sensors, actuators, or other devices, in a plurality of instances of an activity related to measuring and controlling such parameters. In other examples, if the local process model 102 is part of a business process, such as in the lender example given above in which the instances 110a, 110b, 110c correspond to multiple requests for estimates that are provided to multiple lenders, then the workflow data 130 may include, for example, loan parameters provided to the lenders (e.g., size or term of the loan), as well as loan parameters provided by the lenders (e.g., proposed interest rates, or required down payment). As will be appreciated, such data may change from instance to instance of execution of the local process model 102 as a whole. For example, entirely different lenders may be used in a second iteration/execution of the local process model 102, so that the lending parameters may (or may not) change, as well.

It will be appreciated further that different content of the workflow data 130 may result in different outcomes of the multiple instance activity 108. For example, depending on an interest rate proposed by a lender (e.g., if the interest rate is below a certain level), then an immediate acceptance of the corresponding proposal may occur, thereby terminating the multiple instance activity 108. On the other hand, if no received interest rate is sufficiently low enough, then some other criteria may be invoked to decide between the proposals.

Meanwhile, the co-process process model 116, which may be used during the management of the multiple instance activity 108 (e.g., to perform monitoring, reporting, or control of one or more of the instances 110a, 110b, 110c), may be associated with its own co-process handler 132, which may operate conceptually similarly to the activity handler 124 with regard to executing the co-process process model 116. That is, the co-process model handler 132 may be implemented as part of an orchestration engine (such as shown in FIG. 2), and may maintain co-process data 134 (including state data 136 and workflow data 138) that correspond to the type(s) of data just described with respect to the activity data 126, but for the co-process process model 116 (and corresponding activities 118, 120, 122).

As referenced above, and described in more detail below, the co-process process model 116 may share the same data context as the local process model 102, meaning, for example, that activities inside (or associated with) the co-process handler 132 may access all variables and data which are accessible by the activities of the activity handler 124. In the example of FIG. 1, this sharing of context is represented by a mediator 140, which may be configured to provide a communication channel between the activity handler 124 and the co-process handler 132, and between the activity data 126 and the co-process handler 132.

Thus, it will be appreciated that, in the example of FIG. 1, the mediator 140 is not a messaging service or agent in the sense of constructing, routing, or delivering messages having a header, sender/recipient address information, and associated message queues or handlers (examples of elements of such a messaging infrastructure are provided below, with respect to FIG. 2, in the context of cross-organization message exchanges). Rather, as referenced above, the mediator 140 provides direct access to required data, without the need to construct a message for delivery of the data. That is, for example, the mediator 140 may provide transformation functions associated with data access, including copying/reproduction of relevant data, as well as more complex splitting, merging, and/or other computations of the relevant or desired data. For example, an interest rate proposed by a lender associated with the instance 110a may be stored in the workflow data 130, and the co-process process model 116 may access and use this data (interest rate) to perform one of its own activities (e.g., the activity 120), e.g., executing an intermediate or in-process reporting functionality for the multiple instance activity 108, to report received interest rates to a user of the local process model 102.

Thus, in FIG. 1, the mediator 140 is illustrated as a discrete element, and may be implemented explicitly, e.g., as an agent. However, it may be appreciated that some functionality of the mediator 140 may be implemented as part of the activity handler 124, or as part of the co-process handler 132, and that the mediator 140 need not be included as a discrete architectural element.

Figure 4:
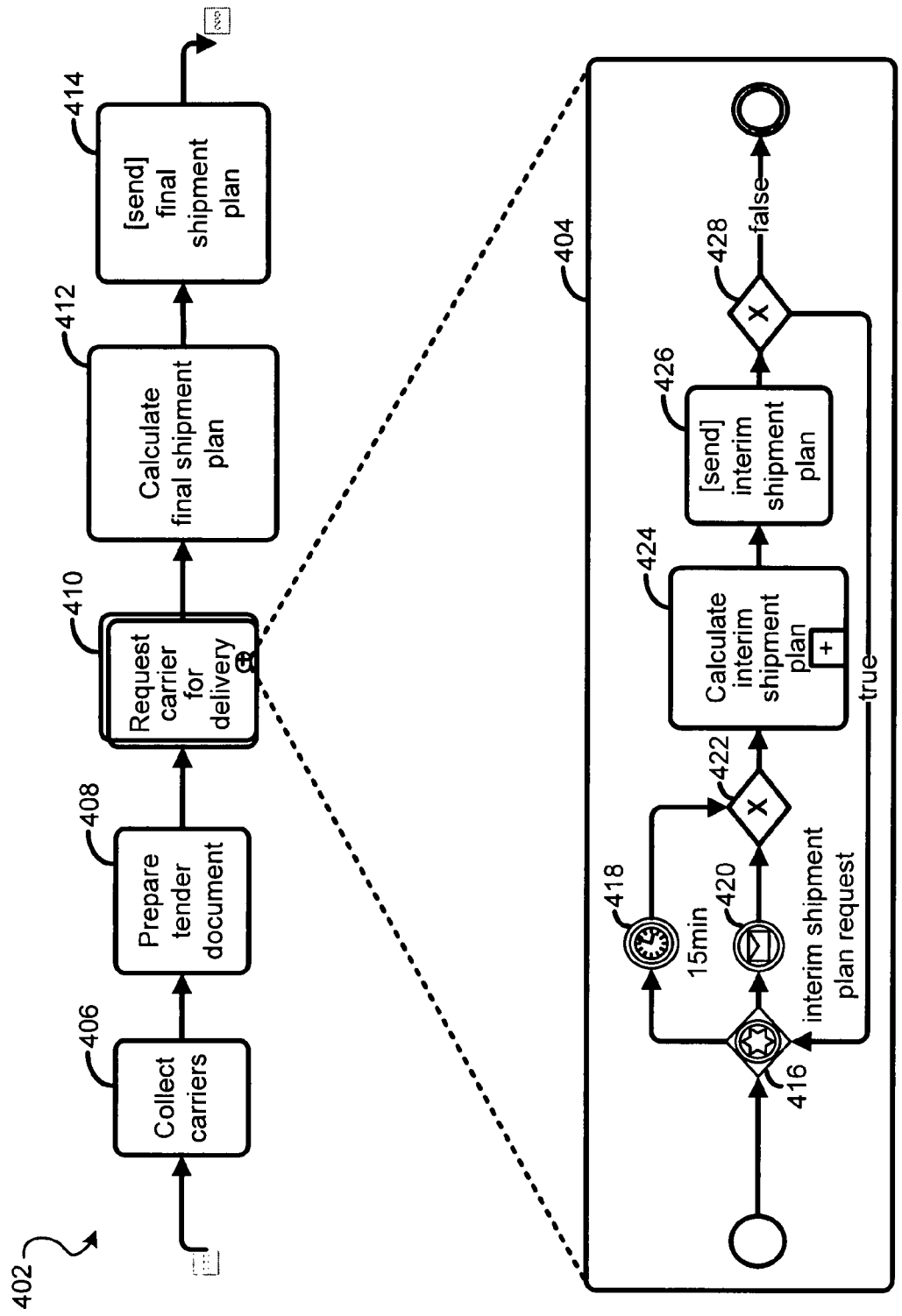
FIG. 4 is an example of a process model and associated co-process process model that may be used in the system of FIG. 1.

For example, it may be appreciated that the local process model 102 is based upon a conventional process design or process description. Similarly, the co-process process model may be associated with its own process description. The co-process process description may be bound or attached to the process description of the local process model, according to certain constraints or parameters (e.g., execution or completion parameters), examples of which are provided herein, so that execution of (instance(s) of) the multiple instances activity 108 and the co-process process model 116 may then proceed in parallel with one another within an orchestration engine (for example, FIG. 4 illustrates an example of the co-process process model 116 executing in parallel with the multiple instances activity 108, shown in that figure as elements 404 and 402, respectively, and discussed in detail in that context). Accordingly, some or all of the execution of the activity handler 124, co-process handler 132, and the mediator 140 may occur implicitly during execution of the attached process models 102, 116.

In the specific example of FIG. 1, the activity handler 124 includes an instance generator 142 that may be used to generate a required number and type of instances (such as the three instances 110a, 110b, 110c) of the multiple instance activity 108. For example, existing modeling languages may include techniques for determining whether, how, and to what extent multiple instances should be generated for a given multiple instance activity. For example, attributes may be provided that include an expression or algorithm for computing a number of instances to be spawned, as well as for determining an order of the instances (e.g., sequential or parallel).

A correlation engine 144 may be used during execution of the multiple instance activity 108 to correlate data (e.g., for the workflow data 130) with a particular instance 110a, 110b, 110c from which the data originated. Or, conversely, the correlation engine may correlate workflow data 130 with a correct one of the instances 110a, 110b, 110c, when required. Similarly, the correlation engine 144 may correlate and store state information regarding executions of each of the instances 110a, 110b, 110c. In example implementations, the correlation engine 144 may include, access, or store an instance identifier associated with an instance in question, and/or with corresponding activity data 126.

An aggregator 146 may be used to aggregate information at completion of (or during) an execution of the multiple instance activity 108. This may include compiling data for storage in the workflow data 130, causing a completion (e.g., erasure) of no-longer needed data or modules, or participating in the synchronization/join/merge behavior represented by control flow construct 112 in FIG. 1.

The mediator 140 may include a lifecycle manager 148 that manages and binds the lifecycles of the multiple instance activity 108 and the co-process process model 116. For example, as referenced above, it may occur that the co-process process model 116 should begin execution at a beginning of an execution of the multiple instance activity 108, and should end at a completion of the multiple instance activity 108 (e.g., even if activities 118, 120, 122 of the co-process model 116 are still running, or have yet to begin running).

A monitor 150 illustrates the functionality of the mediator 140 in proactively monitoring the multiple instance activity 108, including the activity data 126. That is, the mediator 140 need not wait to receive and handle a message from the activity handler 124 regarding the activity data 126; rather, the monitor 150 allows the mediator 140 to directly monitor and access the activity data 126, and to do so in a proactive and as-needed manner, e.g., monitoring only that activity data that is relevant to the co-process process model 116. The monitoring may occur on an on-going basis during execution of the co-process process model 116, and/or may occur only in response to a specific request from the co-process process handler 132.

The description above has been given with respect to the single co-process process model 116. However, it may be appreciated that a plurality of co-process process models may be attached to, or associated with, the local process model 102. Then, the mediator 140 may include a distributor 152 that is responsible for distributing relevant data to corresponding co-processes, where a second such co-process is represented by a co-process handler 154. For example, a first co-process may be involved with reporting intermediate results of the multiple instances activity 108. Meanwhile, a second co-process may be involved with manipulating the workflow data 130, which may occur when circumstances of the execution of the multiple instance activity 108 are altered. For example, in the example above of the loan requests, it may occur that a credit rating of the borrower changes while the loan requests are outstanding; the altered credit rating may then be reflected in the workflow data 130 and may subsequently affect the execution of one or more of the instances 110a, 110b, and 110c).

In operation, it will be appreciated that the monitor 150 and/or the distributor 152 may make use of the instance identifiers or other information used by the correlation engine 144 to track the individual instances 110a, 110b, 110c, and to report activity state data, e.g., regarding state changes in the multiple instances activity 108 (such as an activation, completion, or cancellation of one or more of the instances 110a, 110b, 110c). Thus, the monitor 150 may act on state changes in the local process model 102, e.g., as represented in the activity data 126, such as when the multiple instance activity 108 (or a particular instance 110a, 110b, 110c) begins or ends. Monitoring the activity state data 128 in this way also provides for operation of the lifecycle manager 148, which may manage a lifecycle of the co-process process model 116 based thereon.

The co-process handler 132 may include a subscriber 156 that may allow the co-process handler 132 to register with the mediator 140 and to thereby receive certain specified types of information from the activity data 126, e.g., as the activity data becomes available. Similarly, a result requestor 158 may allow the co-process handler 132 to request specific, required data from the activity data 126. Thus, for example, the subscriber 156 may be used to obtain specified (types of) data that is "pushed" from the mediator 140 (e.g., from the monitor 150 and/or the distributor 152) whenever such data becomes available as part of the execution of the multiple instance activity 108. In contrast, the result requestor 158 may be used to obtain specific data that the co-process handler 132 may "pull" from the activity data 126, only if and when such data is required for execution of the co-process process model 116.

Finally in the co-process handler 132, a result analyzer 160 and a report generator 162 represent examples of useful outputs of the co-process process model 116. For example, the result analyzer 116 may be used to analyze intermediate results of one or more of the instances 110a, 110b, 110c, e.g., to determine a sufficiency of progress of the instance(s). Meanwhile, the report generator 162 may be used to output the results of such analysis, or otherwise to provide information about an output of the co-process process model 116 (e.g., to influence the workflow data 130, or simply to provide information to an administrator of the process model(s) 102, 116). Consequently, the co-process handler 132 may notify the mediator 140 and the activity handler 124 about its own state (e.g., based on the state data 136), such as a state of completed execution thereof. For example, such information about a completed state of the co-process process model 116 may be used by the activity handler 124 to allow a full completion of the local process model 102.

Thus, with the example system 100 of FIG. 1, and similar systems, instances of multiple instances activities are not left to run independently and/or to completion; rather, users or other stakeholders of such instances may be informed or updated about such instances during the execution thereof, and may even exert direct or indirect control over the execution. Consequently, even long-running instances, which may be subject to intermediate or unexpected changes during their lifetimes, or about which users may wish to obtain current information, may be analyzed, controlled, or otherwise managed.

FIG. 2 is a block diagram of a system 200 in which the system of FIG. 1 may be used or implemented. In the example of FIG. 2, a global process model 202 represents a process model (such as a business process model) that is implemented, and agreed on, by a number of collaborating service providers, such that the service providers perform activities 204 of the global process model 202. The service providers may make pre-arrangements regarding their interactions with one another (e.g., arrangements governing messages, message formats, or message types, as well as arrangements governing an order of the messages to be sent and/or tasks to be performed). By way of specific example, a purchase order may be sent by one service provider that may require either acknowledgement or rejection by one or more other service provider(s). The global process model 202 (also referred to as a global choreography model) thus provides a way of capturing, contractualizing, and implementing potentially complex and long-running message exchange sequences between service providers, in order, for example, to execute a desired business process.

For example, and consistent with the examples above, an application 206 may be built and implemented by an enterprise or other entity to perform some business functionality, such as, for example, creating a purchase order and sending the purchase order or loan request to a number of (possibly competing) suppliers. The application 206 may implement the local process model 102 that, analogously to the global process model 202, and, as explained in detail above, formalizes and defines the roles of the application 206, e.g., within the global process model 202, such as with respect to the purchase order or loan request example(s) just mentioned. For example, in the former case, the local process model 102 may describe what types of messages may or should be exchanged with the suppliers as part of the purchase order.

In the example of FIG. 2, activities of the global process model 202 and the local process model 102 are executed at least in part using application services. For example, the application 206 and the local process model 102 may be associated with at least one service 208. In this context, the service 208 may refer to an application having one or more specific functionalities that are exposed to other applications, often over a network (e.g., the Internet) by way of a service interface (where an operation and use of the interface may be known or determined, as needed). When such a service (and/or an interface of the service) is exposed/available over the World Wide Web (referred to herein as the WWW or the web), then the service may be known as a web service.

Using such services and service interactions to implement process models may be referred to as a service-oriented architecture (SOA), in which, as just described, process tasks result in execution of the services. Further, processes that rely on services to realize process steps may themselves be deployed and accessed as services, which may be referred to as process-based service composition. Languages exist, such as, for example, the Business Process Execution Language (BPEL), that are designed to provide such compositions of services (e.g., web services), and thus provide a top-down, process-oriented approach to the SOA. Accordingly, BPEL or other such languages (such as, for example, the Web Services Flow Language (WSFL), the eXtensible language (XLANG), and/or the Business Process Modeling Language (BPML)), or modifications/extensions thereof, may be used to define the global process model 202 and/or the local process model 102.

In FIG. 2, in order to integrate the service 208 within the global process model 102, a messaging infrastructure 210 is included. Generally, the messaging infrastructure 210 facilitates instantiation and execution of the local process model 102. The messaging infrastructure 210 includes an orchestration engine 212 that is operable, among other functions, to execute an instance of the local process model 102 (including the multiple instance activity 108). For example, as referenced above, the orchestration engine 212 may be in charge of ensuring that a given task of the local process model 102 has actually been executed and completed, before allowing the instance of the local process model 102 to proceed to a following task. Other functions and examples of the orchestration engine 114 are known, and/or are described in more detail, herein.

A message repository 214 represents a database or other memory that may be used, for example, to store message types or templates, as well as actual messages (including both outgoing and/or incoming messages). For example, as described in more detail below, the message repository 214 may include a number of message types that are specific to, or associated with, (functionality of) the application 206. For instance, in the case where the application 206 is used to generate purchase orders, there may be a number of associated message types in the message repository 214, which may be pre-configured to some extent based on, for example, a type of purchase order or an identity of the recipient(s) of the purchase order.

A message handler 216 may be used to send and receive actual messages of the messaging infrastructure 210 during communications with other services, such as a service 218 having messaging infrastructure 220. For example, in a case where the orchestration engine 212 is executing a plurality of instances of the local process model 102, the message handler 216 may be responsible for sending messages of the various instances of the local process model 102 to the appropriate recipients, using appropriate transmission techniques and/or protocols. Conversely, for incoming messages, the message handler 216 may be used to sort and/or route messages to appropriate portions of the messaging infrastructure 210, and/or the application 206.

The message handler 216 also may serve as a buffer or queue for incoming and outgoing messages. In this regard, for example, the message handler 216 may serve as a queue for incoming messages, which may ultimately be forwarded to a message log 222. The message log 124 may be used to track each incoming (and outgoing) message(s), and, ultimately, persist the messages to the message repository 214.

Thus, for example, the local process model 102 may describe activities to be performed, as well as messages that may be sent/received as part of such activities, by a manufacturer as part of a manufacturing process, or by some other party/entity. As referenced above, such process models generally include a plurality of activities or tasks that are joined and ordered to obtain a desired result. That is, as illustrated by the example local process model 102 illustrated in FIG. 1, activities (e.g., nodes or tasks) may be joined by appropriate edges (arrows) and control tasks (e.g., splits and/or joins) to obtain structures including parallel tasks, iterative tasks, nested loops, or other known task progressions.

In this context, then, some or all of the system 100 of FIG. 1, or a similar system, may be advantageously implemented. For example, as shown, the orchestration engine 212, during execution of the local process model 102, may encounter the multiple instance activity 108 (not shown in FIG. 2). Then, the orchestration engine 212 may spawn or otherwise implement the activity handler 124, which, if multiple instances are in fact required for execution, may spawn or otherwise generate an instance of the mediator 140 and the co-process handler 132 to implement the co-process process model 116 that is attached or associated with the local process model 102.

As described above, the co-process process model 116 may be referred to as a singleton process, in which case a single instance of the co-process process model 116 is spawned as being unique to all of the instances 110a, 110b, 110c. In this way, for example, activity data 126 may be shared with the co-process process model 116 for a specified set of instances, such as the instances 110a, 110b, 110c. As described, such a singleton process may be executed in the context of the multiple instances activity 108 of the local process model 102, and a lifecycle of the singleton process may be bound to the lifecycle of the multiple instances activity 108 being handled by the activity handler 124; so that, for example, the co-process process model 116 (here, a singleton process) may be spawned by the activity handler 124 in conjunction with spawning the instances 110a, 110b, 110c. By sharing the data context for the activity data 126 (e.g., using the mediator 140 to access state-determining variables), the co-process process model 116 may access the activity data 126 (e.g., the activity state data 128) to determine a number of initiated, completed, or running instances, or may access the workflow data 130 to access or manipulate workflow data that is bound to the context of the multiple instances activity 108.

Thus, the co-process process model 116 may be considered to be part of the local process model 102, or attached thereto using certain parameters that govern an execution or completion of the co-process process model 116 relative to the local process model 102. For example, a process description of the co-process process model 116 may be formulated using a process description language used to design/create process models. For example, the modeling language Business Process Modeling Notation (BPMN) may be used by developers and designers to create the local process model 102 and the co-process process model 116. As is known, BPMN provides intuitive, graphical interfaces, with which designers (even non-technical or business designers) may easily design and create the process model 108. More specifically, the created BPMN-based model may be converted into a format that is executable by the orchestration engine 212, such as an executable language like BPEL, referenced above, for executing instances of the process model 102 (including the activity handler 124, the mediator 140, and the co-process handler 132).

Thus, when constructing the process models 102, 116 using BPMN, extensions thereof, or similar languages, the co-process process model 116 may be attached to the local process model 102 using additional execution and completion parameters. For example, an attribute "executionBehavior: {sequential, parallel, once}" may be used to specify that instances of the co-process process model 116 may be executed, respectively, either sequentially to one another, in parallel with one another, or once (and only once, e.g., as in a singleton process).

Meanwhile, a "completionBehavior {completeAll, completeRunning, Cancel}" may be used to specify a specific type of completion behavior of the attached co-process process model 116. For such completion behavior, "completeAll" may specify that all instances of the co-process process model 116 must be completed, even if the multiple instances activity 108 completes first, and even if some of the co-process instances have not yet started (for sequential executions, however, this may allow refusing acceptance of new start events or triggers for spawning new instances of the co-process process model 116). For "completeRunning," all running instances of the co-process process model 116 may be completed, while non-started and non-triggered instances (e.g., for sequential executions) are either canceled or not accepted. Finally, for "canceled," all running instances of the co-process process model 116 are stopped, and no new instances are spawned or accepted.

A scope and application of the various possibilities and combinations of these execution and completion parameters are described in more detail below, e.g., with respect to FIGS. 4 and 7. In general, though, it may be appreciated that for any of the above parameters, and other parameters, an attached co-process may be executed in the context of the multiple instances activity 108, and may access activity data 126 that otherwise may be exclusive to the multiple instances activity 108, including, as described, activity state data such as the number of spawned, executing, or completed instances of the multiple instances activity 108.

As referenced above, the data access and sharing of the activity handler 124 and the co-process handler 132, e.g., using the mediator 140, means that actual messages need not be constructed for data exchanges between the handlers 124, 132. Nonetheless, the structure of the system 200 illustrates that messaging may occur, if needed, including external messaging that may occur with external partners, such as (an operator of) the service 218, in which case the conventional messaging structures (e.g., the message repository 214, the message handler 216, and the message log 222) may be used to conduct such message exchanges. In particular, it should be appreciated that both the activity handler 124 and the co-process handler 132 may make use of such external message exchanges. For example, in the latter regard, the co-process handler 132 may use the report generator 162 of FIG. 1 to generate a report about an intermediate state of some or all of the instances 110a, 110b, 110c, which then may be included in a message having a header and other message-related structure and features, for sending using appropriate elements of the messaging infrastructure 210.

Figure 3A:
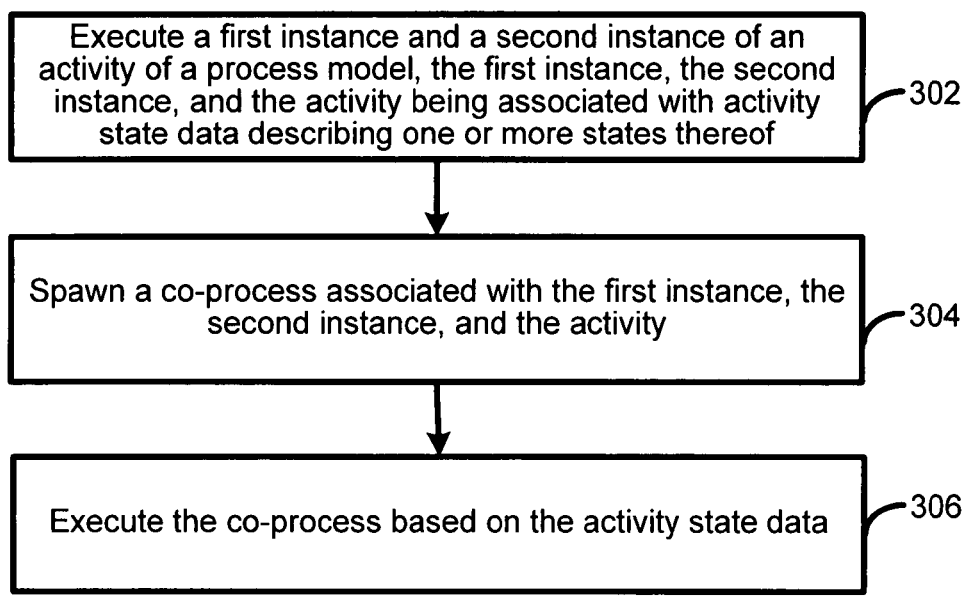
FIGS. 3A and 3B are flowcharts illustrating example operations of the systems of FIGS. 1 and/or 2.
Figure 3B:
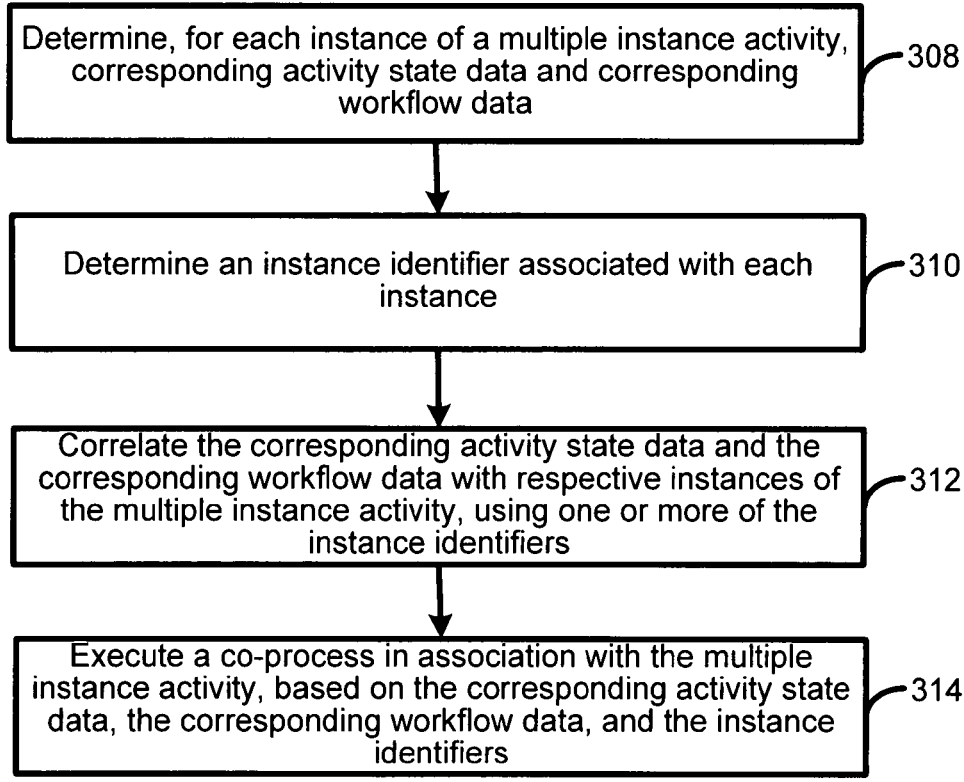

FIGS. 3A and 3B are flowcharts 300a, 300b illustrating example operations of the systems of FIGS. 1 and/or 2. It will be appreciated that the example operations are not limiting as to an order or sequence thereof, and that that operations may therefore be performed in a different order, concurrently, iteratively, in a loop, or in combination with one another, and other operations may be included, as well.

In FIG. 3A, a first instance and a second instance of an activity of a process model may be executed; the first instance, the second instance, and the activity being associated with activity state data describing one or more states thereof (302). For example, the orchestration engine 212 and/or the activity handler 124 may execute the instance 110a and the instance 110b (as well as the instance 110c, and other instances, not shown) of the multiple instance activity 108 of the local process model 102. Such execution, as described, may occur based on the activity data 126, which may include the activity state data 128. More specifically, for example, after completion of the activity 106, the orchestration engine 212 may spawn the activity handler 124, or the activity handler may have been previously created, and the instance generator 142 may calculate and spawn an appropriate number and type of instances, as described above with respect to FIG. 1.

A co-process may be spawned that is associated with the first instance, the second instance, and the activity (304). For example, the orchestration engine 212 and/or the activity handler 124 may spawn one or both of the co-process handler 132 and one or more instances of the co-process process model 116. In examples where the co-process is to be a singleton process, then only a single instance of the co-process process model 116 may be spawned. As described, the co-process may be associated with the instances 110a, 110b, 100c by sharing the data context of the activity data 126, including the activity state data 128, e.g., by way of the mediator 140. Further, a process description of the co-process process model may be bound to a process description of the local process model 102 using attributes or parameters that specify an execution and completion behavior of the co-process process model, e.g., relative to execution of the local process model 102. Still further, a plurality of such co-processes may be spawned, in order to each provide a specified or desired function, in which case the mediator 140 may be used to route information (e.g., the activity state data 128) appropriately between the various co-process handlers 132, 154, and to control access of the co-processes to the context of the multiple instance activity 108.

The co-process may be executed based on the activity state data (306). For example, the orchestration engine 212 and/or the co-process handler 132 may execute the instance(s) of the co-process process model 116, based on the activity state data 128. In a more specific example, the co-process handler 132 may either automatically receive certain (types of) activity or instance state information (e.g., from the monitor 150), or may request such information on an as-needed basis (e.g., using the result requestor 158). For example, the co-process handler 132 (e.g., the subscriber 156) may subscribe at the mediator 140 to be notified when a certain threshold of instances 110a, 110b, 110c (and possibly others) have been started or completed, and the monitor 150 may then provide such information automatically, as it becomes available.

Additional or alternative operations are contemplated and may be implemented. For example, in FIG. 3B, for each instance of a multiple instance activity, corresponding activity state data and corresponding workflow data may be determined (308). For example, the activity handler 124 (e.g., using the correlation engine 144) and/or the mediator 140 (e.g., using the monitor 150) may determine, for each instance 110a, 110b, 110c of the multiple instance activity 108, portions of the activity state data 128 and the workflow data 130 which correspond thereto.

An instance identifier associated with each instance may be determined (310). For example, as part of the operations and examples just given, the correlation engine 144 and/or the monitor 150 may determine an instance identifier for the instance 110a, which may be the same as, or used with, the determined, corresponding activity state data and workflow data.

The corresponding activity state data and the corresponding workflow data may be correlated with respective instances of the multiple instance activity, using one or more of the instance identifiers (312). For example, the mediator 140, when providing activity data 126 to the co-process handler 132, may provide information about which of the instances 110a, 110b, 110c is being described by the activity state data 126. Again, such information may be partially provided by the correlation engine 144.

A co-process may be executed in association with the multiple instance activity, based on the corresponding activity state data, the corresponding workflow data, and the instance identifiers (314). For example, one or more instances of the co-process process model 116 may be executed-in association with the multiple instances activity 108, based on corresponding portions of the activity state 128, the corresponding portions of the workflow data 130, and using the instance identifiers. As described, then, the executing co-process may be enabled to reason about the state of some or all of the multiple instances 110a, 110b, and 110c, and thereby to take action on, or in response to, the state data or other related data for each instance. For example, as described, the executing co-process may analyze interim results of the multiple instance activity 108, and may then send out reports, or influence or control a behavior of the multiple instance activity 108, including even canceling the multiple instance activity 108 (which may cause a cancellation of the executing co-process itself).

FIG. 4 is an example of a process model 402 and an associated co-process process model 404 that may be used in the system of FIG. 1. As shown, the process model 402 of FIG. 4 includes activities 406-414, which correspond conceptually to, and provide more specific examples for, activities 104-114 of FIG. 1, including the multiple instance activity 410 which corresponds to the multiple instance activity 108 of FIG. 1.

Specifically, the process model 402 is in the context of a shipment process for a shipment. The shipment may be organized along different carriers, and the various carriers may require time to determine whether they will be able to perform the requested shipment(s). Thus, the activities include collecting a list of carriers (406), preparing a tender document (408) for sending to the carriers, requesting carriers for performing the delivery (410), calculating a final shipment plan (412), and sending the final shipment plan (414).

As shown, the activity 410 of requesting carriers for delivery may be implemented as a multiple instance activity, such as the multiple instance activity 108 of FIG. 1. For example, a plurality of instances may be spawned, in each one of which the prepared tender document is sent to a different carrier. By executing these instances in parallel, execution time of the process model 402 may be shortened.

Thus, each instance of the activity 410 corresponds to a request to a different carrier, and each request may entail a complex action(s) in order to ultimately determine an optimum shipment plan. For example, the tender document of activity 408 may specify, or be associated with, a number of parameters associated with the shipment, such as delivery route(s) (including delivery by land, sea, or air, or some combination), parameters associated with distributing perishable items, time constraints on the shipment, required crossings of international borders and associated inspections that must occur, and other factors that should be provided to the carriers for determination of how best to proceed, and what an associated cost and time may be. Moreover, some of these parameters may not be known at a time of the preparation of the tender document, or may change after one or more of the requests have gone out. In particular, such difficulties may arise when a relatively lengthy time passes between the preparation of the tender document 408 and the calculation of the shipment plan 412, since, for example, there may be more opportunities for such interim changes to occur.

Thus, it may occur that a customer, e.g., for whom the shipment is being planned, may wish to know a current or interim status of the request(s) for delivery 410, or other information regarding the requests. Accordingly, the co-process 404 may be used that is configured to send an interim shipment plan every 15 minutes (or some other appropriate time period), while also allowing the customer(s) to request a current, interim shipment plan.

In the example of FIG. 4, the co-process 404 may be implemented as a singleton process, in which one and only one instance of the associated co-process process model is used to determine the interim shipment plans for all of the instances of the multiple instance activity 410. In the co-process 404, a deferred choice or event-driven gateway 416 (which may be constructed and specified, for example, using BPMN or other suitable language) may wait either for the 15 minutes calculation 418 or for the interim shipment plan request 420.

A gateway 422 may be used, which essentially implements an XOR functionality to execute whenever one of the activities 418, 420 occurs. Then, an activity 424 for calculating an interim shipment plan may be executed, followed by an activity 426 for a sending of the interim shipment plan (e.g., to external partners/customers such as represented by the service 218 of FIG. 2, and using the messaging infrastructure 210 of FIG. 2.

It may be appreciated from the above discussion of FIGS. 1-3 that the activities 424, 426 may be executed based on data (e.g., the activity state data 128 and the workflow data 130) associated with the activity 410, and with its corresponding plurality of instances. That is, in order to calculate the interim shipment plan 424, some, most, or all of the variables referenced above for calculating the final shipment plan 412 may need to be accessed. By sharing the data context of the activity 410, the activity 424 of the co-process 404 may perform the interim shipment plan calculation in much the same way that the activity 412 calculates the final shipment plan, and using data that would normally only be available to the multiple instances activity 410 itself.

The XOR construct 428 has only one input, and continually evaluates to true and returns to the gateway 416, so that the co-process 404 operates in a continual loop. However, as described above, a lifecycle of the co-process 404 may be bound to, and the same as, the multiple instances activity 410. For example, when a first instance (request) of the activity 410 begins, then the instance of the co-process 404 may begin execution. When a final instance (request) of the activity 410 ends, then the instance of the co-process 404 also ends (cancels). As described, such a binding of lifecycles may occur, for example, using the lifecycle manager 148 of the mediator 140 (which also may be implemented in whole or in part in conjunction with the activity handler 124 or the co-process handler 132), using the activity state data 128 that provides information about a current state of execution (or completion) of each instance (request) of the activity 410.

Figure 5:
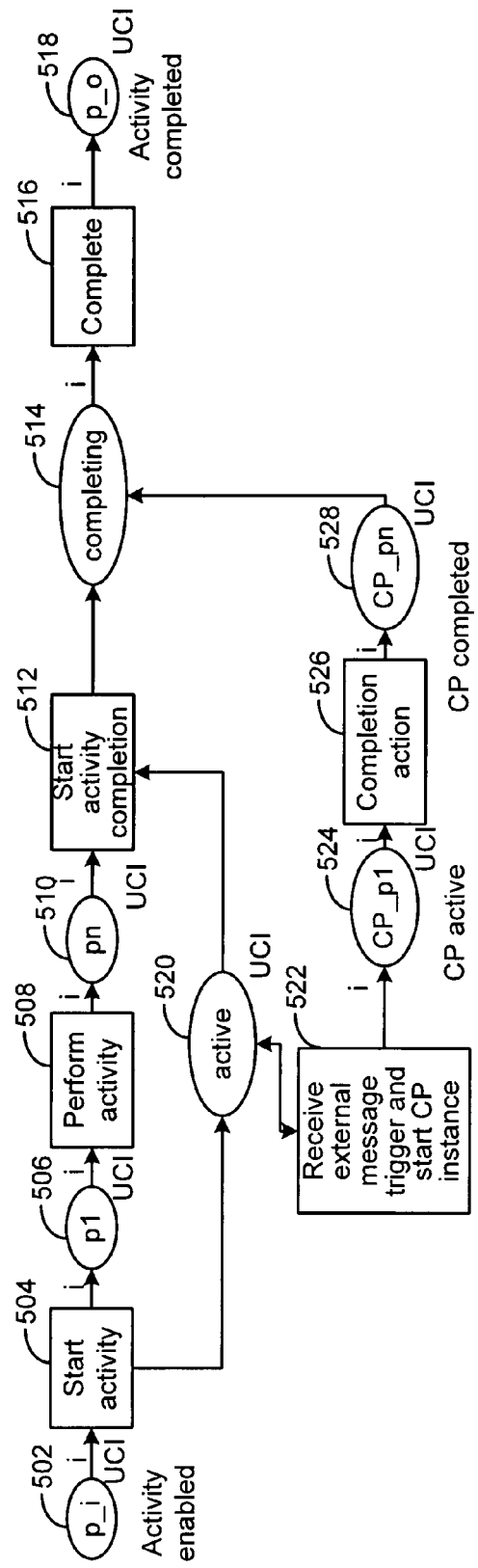
FIG. 5 is a coloured Petri net illustration of a common structure that may be used for a co-process of the system of FIG. 1.

FIG. 5 is a coloured Petri net illustration 500 of a common structure that may be used for a co-process of the system of FIG. 1, such as instances of the co-process process model 116 of FIG. 1, or the co-process 404 of FIG. 4. In general, a Petri net refers to a known modeling language or technique in which arcs (direct arcs) may run between "places" and "transitions," where the transitions are referred to as having either "input places" (if leading to a transition by way of an arc) or "output places" of the transition (if receiving an arc from a transitions). Such Petri nets may be used to model actions associated with workflow processing. In this case, the places of the Petri net may contain tokens (where, in BPMN/BPEL, and in other contexts and languages, activation of branches or activities may be referenced or described as passing or routing a control token(s), such as just referenced), so that transitions may be said to respond to input tokens by "firing," where an enabled transition may fire if there are tokens in each input place of the transition. When firing, a transaction uses tokens from its input places, executes any associated processing, and puts tokens into the various output places. In standard Petri nets, such tokens are indistinguishable from one another, while coloured Petri nets provide an extension in which each token has a specific value, where such values may be used to base expressions and make decisions.

In FIG. 5, then, reference is made to the description above in which co-processes may be attached to process models (e.g., to multiple instances activities thereof) using attributes to specify desired execution and completion behavior for the co-process(es). For example, as referenced, execution behavior may be specified as {sequential, parallel, once}, which determines how many instances of the co-process may be allowed at all, or at a point in time. Meanwhile, completion behavior may be specified as {complete all, complete running, or cancel}, which determines how the remaining instances of the co-process (if any) are treated once the associated activity of the process model is able to complete.

With the above example(s), it may be seen that for the two behavior characteristics having three parameters each, there are nine possible configurations of how the co-process is attached to the multiple instances activity. FIG. 5 thus represents a common core or backbone structure for these different configurations, which may be modified as appropriate for each configuration.

In FIG. 5, whenever the multiple instance activity (e.g., 108 in FIG. 1 or 410 in FIG. 4) begins (e.g., when a first instance thereof activates) at a place 502 of a transition 504, the activity puts a token in place active 520. Then the activity goes through place 1 (p1) 506 to perform whatever activity is associated therewith (such as requesting a carrier for a delivery, as in FIG. 4), as shown by the transition 508, which continues through place n (pn) 510 until the activity begins completion 512.

Meanwhile, the co-process may be started, as shown in FIG. 5 and as appreciated from the example of FIG. 4, based on an external message trigger 522, and is thereafter represented in FIG. 5 through the places CP_p1 524, and CP_pn 528, with an intervening transition 526 represents the activity taken to successfully complete an instance of the co-process (i.e., of the co-process process model). When CP-pn 528 completes, then the activity may continue completing 514, followed by a completion transition 516 that leads to a place p_0 518 which represents completion of the activity.

Thus, in the example of FIG. 5, a trigger to instantiate an attached co-process (e.g., 116 or 404) may only be received while the underlying activity (e.g., 108 or 410) is in state 'active.' Moreover, the activity may complete as soon as no attached co-process is running anymore. Then, the difference in behavior based on the configuration of the execution and completion parameters mentioned above may be shown as additional arcs, places, and transitions.

Figure 6:
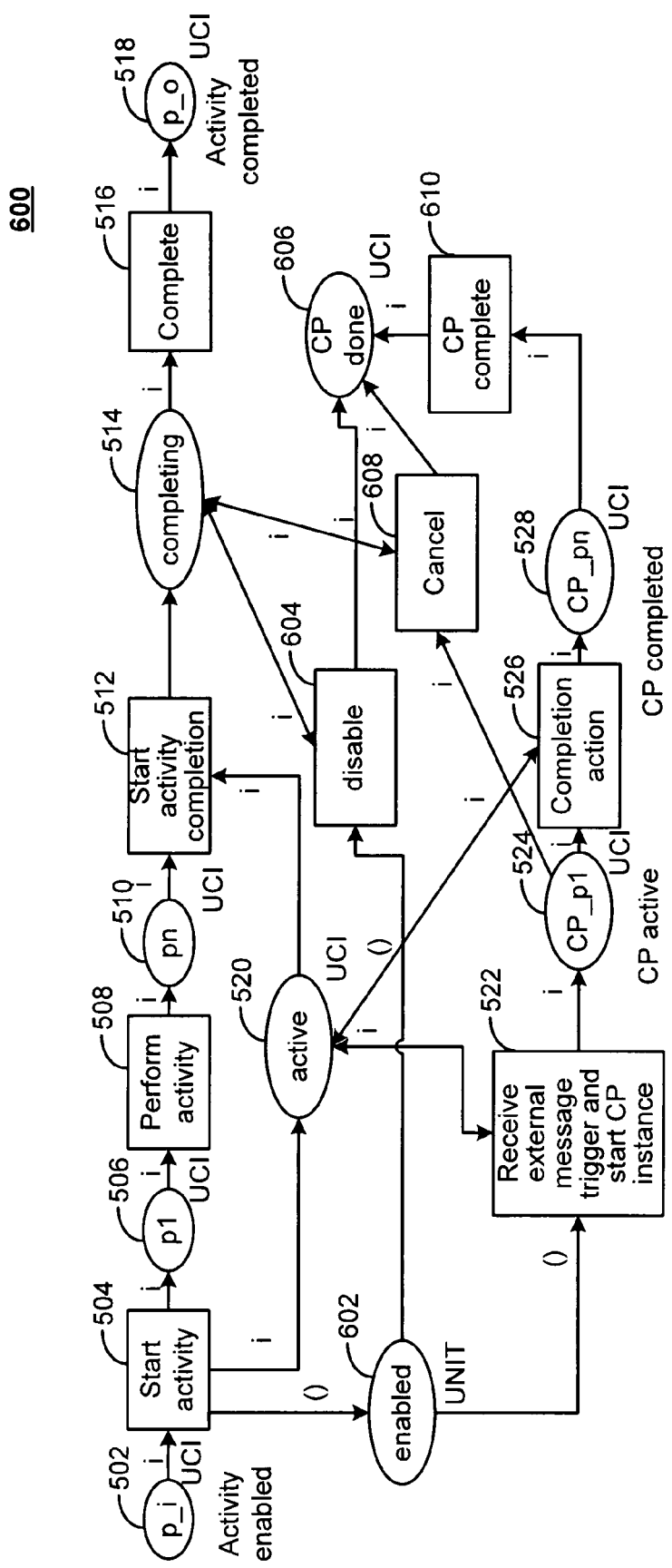
FIG. 6 is a coloured Petri net illustration of an example configuration of the common structure of FIG. 5.

For example, FIG. 6 is a coloured Petri net illustration 600 of an example configuration of the common structure of FIG. 5, in which the specific configuration of execution behavior=once and completion behavior=cancel, corresponding to the singleton process described herein, is illustrated.

In FIG. 6, a single token is put in place 602 'enabled' upon the start of the activity. This enables the attached co-process (CP) to receive exactly one trigger and start execution. If no trigger is consumed, and the single enabling token is still in place 'enabled' 602 while the activity starts completion at transition 512, then the enabling token is disabled by transition 'disable' 604 and placed in place CP done 606.

Meanwhile, the attached co-process instance is cancelled once the activity starts execution. Cancelling in this example means that the transition 526 for the action of the co-process cannot execute anymore, and, instead, a bypass transition 608 'cancel' is executed instead. The activity completes execution when a token is in place 'completing' 514 and place 'CP done' 606, which means that either the attached co-process has successfully completed execution at transition 610, was successfully cancelled at transition 608, or was never executed and the enabling token was disable at transition 'disabled' 604.

Figure 7:
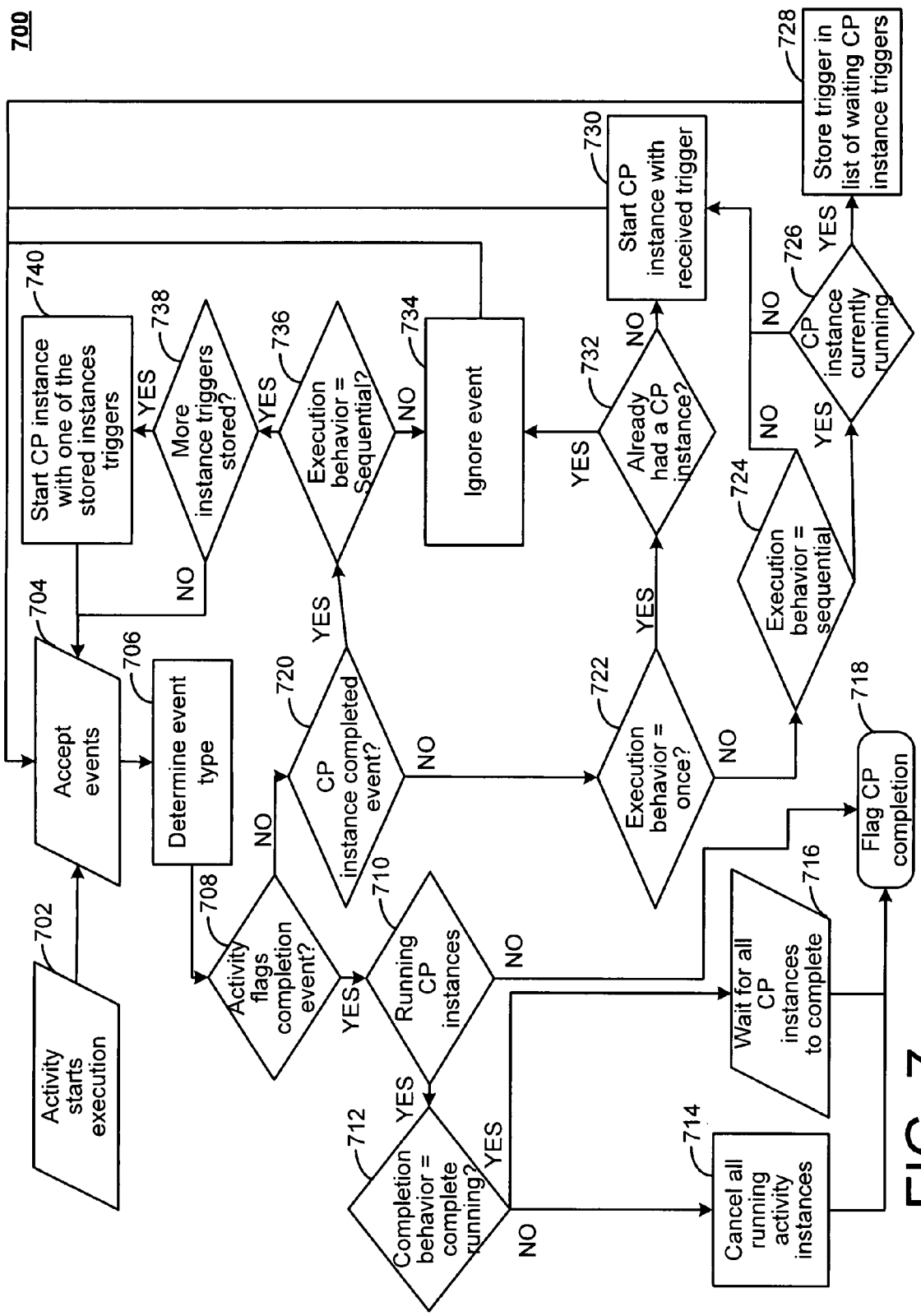
FIG. 7 is a flowchart illustrating additional example operations of the system of FIG. 1.

FIG. 7 is a flowchart 700 illustrating additional example operations of the system of FIG. 1, and FIG. 8 is a flowchart 800 that is also illustrating additional example operations of the system of FIG. 1. More specifically, and analogously to FIGS. 5 and 6, respectively, FIG. 7 is a flowchart illustrating operations of an attached co-process (such as an instance of the co-process process model 116 or 404) that may be subject to various combinations of some or all of the execution and completion behaviors described above, i.e., in this example, execution behavior specified as {sequential, parallel, once}, and completion behavior as {complete running, or cancel] (FIG. 7 does not include the completion behavior {complete all} for conciseness, but corresponding modification of FIG. 7 to include this completion behavior is straight-forward from the present description, e.g., from the description above of FIG. 5). Meanwhile, the flowchart 800 of FIG. 8 illustrates operations of the attached co-process for the specific configuration of execution behavior=once and completion behavior=cancel; i.e., a singleton process as referenced above.

In the example of FIG. 7, then, an initial trigger to enable the attached co-process may be the activation of the (multiple instance) activity with which this attached co-process is associated, which begins execution of the activity and thereby enables the attached co-process (702), as described above. Then, an event may be received and accepted (704), and an event type may be determined (706). For example, such an event may refer to a trigger for an interim report, as referenced above, or some other event that contains information about the activity or about an external party or entity (e.g., such as the customer referenced in FIG. 4).

For example, it may be determined whether the event type is an "activity completion" event (708), which may convey that the activity to which the co-process is attached is able to complete execution. If so, then it may be determined whether there are currently running or executing co-process (CP) instances (710). If so, then the attribute for completion behavior may be checked to see whether the attribute is set to 'completion behavior=complete running' (712). If not, then all running instances of the activity may be canceled (714), on the assumption that the completion behavior must be set to "cancel" (that is, assuming that are no other possible completion behaviors, such as the completion behavior of 'complete all,' discussed above). If the completion behavior is set to 'completion behavior=complete running,' then a wait may occur for all co-process instances to complete (716). In this case, as explained above, an associated system (e.g., the system 100 and/or 200) may wait for all co-process instances to complete (meaning new instances of the co-process may not be instantiated) at this point.

Whether the instances may be canceled immediately or after all executing instances of the co-process complete, the subsequent completion of the co-process may then be flagged (718). Similarly, if there were no running co-process instances (710), then the co-process also may be flagged for completion (718), as shown.

If the determined event type is not associated with a completion event of the activity (708), then the co-process may (continue) executing and it may be determined whether the event is a completion event for the instance of the attached co-process (720), e.g., whether one of the formerly spawned co-process instances has completed execution. If not, then it may be presumed that the event is an instance trigger event for the attached co-process. Then, if the execution behavior is checked and determined not to have the value 'once' (722), then it may be determined whether the execution behavior of the attached co-process has the value 'sequential' (724). If so, and if an instance of the attached co-process is currently running (726), then the instance trigger may be stored in a list or queue of waiting instance triggers for the attached co-process(es). If, however, there is no instance of the attached co-process currently running (726), or if the execution behavior is not 'sequential' (724), then the instance of the attached co-process may be started with the received event or trigger. In the latter case, it may be recognized that if the execution behavior is not 'once' or 'sequential,' then it must be parallel, in which case, as shown, the co-process instance may be started immediately (730), and the activity returned to a state of accepting events.

On the other hand, if the execution behavior is determined to have the value 'once' (722), and if there is no other existing co-process instance (732), then, again, the instance of the attached co-process may be started with the received event or trigger. (730). Otherwise, if there is another existing co-process instance (732), then the event may again be ignored (734).

If the received event, however, is an instance completion event for the co-process (720), and if the execution behavior is not sequential (736), then the event may be ignored (734). Otherwise, if the execution behavior is sequential (736), then it may be determined whether more triggers are stored (738). If not, then further events may be accepted (704), as they arise. Somewhat similarly, if more instance triggers (events) are stored (738), then a co-process instance may be started with one of the stored instance triggers (740).

As different events come in, eventually all of the co-process instances may complete on their own (e.g., in response to a message regarding an event, or a time-out), or, if not, may complete in conjunction with a lifecycle of the activity. Thus, eventually, the operations of the flowchart 700 reach the flagging of a completion of the co-process process model.

FIG. 8 is a flowchart 800 illustrating additional example operations of the system of FIG. 1. As referenced above, the flowchart 800 of FIG. 8 is included specifically to illustrate the configuration of execution behavior of 'once,' and completion behavior of 'cancel.'

Thus, it may be seen in FIG. 8 and understood from the above description that after starting activity execution (702), accepting/receiving events (704), and determining an event type (706), then again it may be determined whether the activity or event flags a completion event (708) for the co-process. If so, then if there are any executing activity instances, the executing activity instances may be canceled (714), and completion of the co-process may be flagged. Otherwise, if there is no running co-process instance(s) (708), then, again, the completion of the co-process may be flagged.

Meanwhile, if the event is not a completion event for the activity (708), then it may be determined whether the event is a completion event for the co-process (720). If not, and if there is no existing co-process instance (732), then it may be determined that the event must be an instance trigger event, in which case the (singleton) co-process may be started with the received trigger event (730), and the activity and/or the co-process may continue to accept events (704). Otherwise, if the received event is a completion event for the activity in question, or if there already is an executing co-process instance (732), then the event may be ignored (734) and the activity and/or co-process process model may continue to accept new events.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable storage medium and executable by at least one processor, the system comprising:
   an activity handler configured to cause the at least one processor to execute multiple activities of an executing process model instance of a process model including multiple instances of at least one activity of the multiple activities, and configured to maintain activity state data in a database associated with a state of execution of each activity including the multiple instances of the at least one activity of the multiple activities;
   a co-process handler configured to cause the at least one processor to execute a co-process process model in parallel with the execution of each instance of the multiple instances of the at least one activity of the multiple activities, based on the activity state data; and
   a mediator configured to cause the at least one processor to provide the co-process handler with direct access to the activity state data stored in the database, for execution of the co-process process model based thereon;
      wherein the co-process handler is further configured to cause the at least one processor to execute the co-process process model in parallel with the execution of each instance of the multiple instances of the at least one activity to monitor execution of each instance, collect and distribute data associated with each instance, and influence a behavior of each instance, based on the activity state data.

2. The system of claim 1 wherein the activity state data includes instance identifiers correlating the activity state data with one or more of the multiple instances.

3. The system of claim 1 wherein the activity state data includes a number of the multiple instances that have started or completed.

4. The system of claim 1 wherein the activity state data is included with activity data for the multiple instance activity, the activity data including workflow data correlated with each of the multiple instances, and further wherein the mediator is configured to provide the co-process handler with at least a portion of the workflow data, for execution of the co-process process model therewith.

5. The system of claim 4 wherein the co-process handler is configured to modify at least a portion of the workflow data, based on the execution of the co-process process model, and to thereby alter the execution of at least one of the multiple instances.

6. The system of claim 1 wherein the co-process process model shares a data context of the activity state data.

7. The system of claim 1 wherein the co-process handler executes a single instance of the co-process process model having a lifecycle that coincides with a lifecycle of the multiple instance activity.

8. The system of claim 1 wherein the co-process handler comprises a result analyzer that is configured to analyze intermediate results of instances of the multiple instances activity, prior to a completion of the multiple instances activity, by executing corresponding portions of the co-process process model.

9. The system of claim 1 wherein the co-process handler comprises a report generator that is configured to output a report regarding intermediate results of instances of the multiple instances activity, prior to a completion of the multiple instances activity, by executing corresponding portions of the co-process process model.

10. The system of claim 1 wherein the co-process handler is registered with the mediator to receive specified types of the activity state data, and wherein the mediator comprises:
   a monitor that is configured to detect the specified types of the activity state data; and
   a distributor that is configured to provide the specified types of the activity state data to the co-process handler.

11. The system of claim 1 comprising a plurality of co-process handlers, each executing a corresponding co-process process model, wherein the mediator is configured to provide specified portions of the activity state data to corresponding ones of the co-process handlers.

12. The system of claim 1 wherein the mediator is configured to provide one or both of state data or workflow data that is associated with the execution of the co-process process model for the execution of one or more of the multiple instances, based thereon.

13. A method comprising:
   executing multiple activities of an executing process model instance of a process model including multiple instances of at least one activity of the multiple activities;
   executing a first instance and a second instance of the multiple instances of the at least one activity of the multiple activities of the executing process model instance of the process model, the first instance, the second instance, and the activity being associated with activity state data stored in a database describing one or more states thereof;
   spawning a co-process associated with the first instance, the second instance, and the activity;
   providing direct access to the activity state data stored in the database, for execution of the co-process; and
   executing the co-process in parallel with the first instance and the second instance, based on the activity state data stored in the database;
      wherein the executing the co-process comprises executing the co-process in parallel with the first instance and the second instance to monitor execution of each of the first and second instance, collect and distribute data associated with each of the first and second instance, and influence a behavior of each of the first and second instance, based on the activity state data.

14. The method of claim 13 wherein executing the first instance and the second instance of the activity of the process model comprises:
   storing the activity state data including a current state of initiation, execution, or completion of each of the first instance and the second instance; and
   storing first workflow data associated with the first instance and second workflow data associated with the second instance.

15. The method of claim 13 wherein spawning a co-process associated with the first instance, the second instance, and the activity comprises:
   spawning a single co-process instance in conjunction with a spawning of the activity; and
   canceling the co-process instance in conjunction with an ending of the activity, including an ending of the first instance and the second instance.

16. The method of claim 13 wherein executing the co-process based on the activity state data comprises:

executing the co-process in the same data context as the first instance, the second instance, and the activity.

17. The method of claim 13 wherein executing the co-process based on the activity state data comprises:
monitoring the activity state data for reporting thereof for use in the executing of the co-process.

18. The method of claim 13 wherein executing the co-process based on the activity state data comprises:
determining an execution behavior of one or more instances of the co-process to include one of a sequential execution of the one or more instances, a parallel execution of the one or more instances, and an execution of a single instance;
determining a completion behavior of the co-process in response to a completion of the activity to require one of: a completion of all of the one or more instances, a completion of all of the one or more instances that are currently executing, and a cancellation of the one or more instances; and executing the one or more instances of the co-process in parallel with the activity.

19. A computer program product for executing process models, the computer program product being tangibly embodied on a non-transitory computer-readable storage medium and including executable code that, when executed, is configured to cause at least one data processing apparatus to:
execute multiple activities of an executing process model instance of a process model including multiple instances of at least one activity of the multiple activities;
determine, for each instance of the multiple instance activity of the executing process model instance of the process model, corresponding activity state data and corresponding workflow data stored in a database;
determine an instance identifier associated with each instance;
correlate the corresponding activity state data and the corresponding workflow data with respective instances of the multiple instance activity, using one or more of the instance identifiers;
provide direct access to the activity state data and the corresponding workflow data stored in the database, for execution of a co-process; and
execute the co-process in parallel with the multiple instance activity, based on the corresponding activity state data, the corresponding workflow data, and the instance identifiers;
wherein the co-process executes in parallel with the multiple instance activity to monitor execution of each instance activity, collect and distribute data associated with each instance activity, and influence a behavior of each instance activity, based on the corresponding activity state data, the corresponding workflow data, and the instance identifiers.

20. The computer program product of claim 19 wherein the co-process executes in parallel with the multiple instance activity and within a data context of the multiple instance activity, and wherein a lifecycle of the co-process is bound to a lifecycle of the multiple instance activity.

* * * * *